United States Patent [19]

Schwab

[11] 4,431,773

[45] Feb. 14, 1984

[54] ADHESIVE COMPOSITION, FILM LAMINATE AND PRODUCT POUCH OR TUBE THEREFROM

[75] Inventor: Frederick C. Schwab, Metuchen, N.J.

[73] Assignee: Mobil Oil Corporation, New York, N.Y.

[21] Appl. No.: 386,458

[22] Filed: Jun. 8, 1982

[51] Int. Cl.³ .................. C08L 9/00; C08L 53/00
[52] U.S. Cl. ........................ 525/98; 428/35; 525/99
[58] Field of Search ............ 525/92, 98, 99, 95, 525/97; 526/308

[56] References Cited

U.S. PATENT DOCUMENTS 3,862,068  1/1975  Russell ........................ 525/97
4,179,480  12/1979  Hsieh ........................... 525/99

Primary Examiner—J. Ziegler
Attorney, Agent, or Firm—Alexander J. McKillop; Michael G. Gilman; James P. O'Sullivan, Sr.

[57] ABSTRACT

An adhesive composition comprising a combination of a styrene-butadiene block copolymer, a cyclopentadiene-styrene resin and a random terpolymer of 1,3-pentadiene, a monocyclic terpene, and alpha methylstyrene. A flexible film laminate and product pouch or tube therefrom comprising two or more polymer film layers adhesively bonded together by means of a layer of the defined adhesive.

5 Claims, No Drawings

ADHESIVE COMPOSITION, FILM LAMINATE AND PRODUCT POUCH OR TUBE THEREFROM

BACKGROUND OF THE INVENTION

The present invention relates to an adhesive composition, a film laminate and retortable food or product pouch or tube therefrom.

Certain packaging applications, for example, retort packaging, require that the packaging material constitute a good barrier to the passage of oxygen and moisture vapor. In addition, the packaging of certain foods require that a minimum of oxygen or air be transmitted to the contents. Cheese is one food product which should be packaged to the exclusion of oxygen.

Oriented polyacrylonitrile (PAN) film has excellent oxygen barrier properties. Its moisture barrier properties, however, are less than desirable for retort packaging. Furthermore, it is not heat-sealable to itself. Both deficiencies can be overcome by applying to the surface of the PAN a layer of a thermoplastic material having good moisture barrier properties. However, because of the significant chemical dissimilarity between PAN and thermoplastic moisture barrier polymers, such as polyolefins, adhesion between the two materials is poor and package integrity suffers. It is necessary, therefore, to consider the imposition of an adhesive or bonding system between the PAN and the thermoplastic moisture barrier which will result in acting as a mutually adherent bridge between the two materials. It has been found, however, that materials which exhibit good adhesion to PAN generally do not exhibit good adhesion to other polymer materials such as a polyolefin film.

The prior practice of providing an adhesive bridge between PAN and an effective moisture barrier film, has involved the application of an adhesive such as polyurethane or a polyester in a liquid vehicle. By this means, the adhesive is applied to the PAN and subsequently the moisture barrier film is laminated to the PAN via this adhesive. Such procedures, in spite of the use of such expensive adhesives, have not resulted in supplying the industry with an economical and effective flexible film laminate for retortable food pouch use.

In recent years, the food packaging industry has shown intense interest in the concept of pouch-packed foods which, among other advantages, do not require freezing for their preservation and can therefore dispense with costly and energy-intensive refrigerated transporation and storage facilities. Much effort has gone into the development of a flexible retort or autoclaveable food pouch, which not only can withstand the rigors of sterilization and later reheating and provide barrier properties which are sufficient to adequately protect the contents during storage, but which also employs materials which are toxicologically safe.

In accordance with U.S. Pat. No. 3,453,173 a polyolefin-polyacrylonitrile laminate, which is said to possess superior heat-seal strength and excellent barrier properties to the transmission of gases and is adaptable for the construction of food containers, is prepared by bringing the polyolefin surface and the polyacrylonitrile surface together and adhering the adjacent surfaces to each other through an adhesive. Either or both can be pretreated in some manner in an effort to make them more adherent, e.g., by treatment with a gaseous mixture of boron trifluoride, as described in British Pat. No. 834,196; by flame treatment or by treatment by corona discharge as described in U.S. Pat. No. 2,632,921. Among the adhesives employed in the manufacture of the laminate is an ethylene-vinyl acetate copolymer described in U.S. Pat. No. 2,200,429. Because the conditions of preparation and the adhesive contemplated are not conducive to the formation of primary valence bonding, the interlaminar adhesion in boiling water would not be expected to be strong.

Resort also has been had to metallizing the PAN film in order to employ the metal layer as an effective surface through which adhesion can be accomplished to the water vapor barrier film. This also is a somewhat expensive compromise.

It is an object of the present invention to present a novel and effective adhesive composition having particularly effective utility in bonding surfaces together, particularly organic film surfaces.

It is another object of the invention to present a film laminate employing the adhesive composition of the present invention.

Yet another object of the invention is to present a product or food pouch or tube which is effective in withstanding the rigors of hot or boiling water.

SUMMARY OF THE INVENTION

In accordance with the present invention, an adhesive composition for use in bonding polymeric surfaces together is provided which comprises a combination of:
 (a) a styrene-butadiene block copolymer having a monomer parts by weight ratio of from 1 to 3:3 to 1;
 (b) a cyclopentadiene-styrene resin having a monomer parts by weight ratio of from about 1:2 to 1:4 respectively; and
 (c) a random terpolymer of (1) 1,3-pentadiene, (2) a monocyclic terpene; and (3) alpha methylstyrene, wherein the monomers are in a parts by weight ratio of from about 3–4:3–4:2.5–3.5 respectively; said combination comprising a parts by weight ratio of from about 7–10 of (a), 0.5–1.5 of (b), and 2–4 of (c).

Also in accordance with the present invention, a flexible film laminate which, among other uses, is adaptable for use in the manufacture of a product pouch or tube for the packaging of food or other commodity, is provided which comprises: two or more polymeric films bonded together by means of the adhesive composition of the present invention.

Further in accordance with the present invention is a product pouch or tube fabricated from any of the laminates described herein.

DETAILED DESCRIPTION OF THE INVENTION

As indicated above, the adhesive composition of the instant invention is a combination of the three materials broadly recited above. The first material of this combination, i.e., the styrene-butadiene block copolymer, is commercially available, for example, it can be obtained under the name Kraton 1000, Series Products (Shell Chemical Company, Polymers Division). One material, Kraton 1101, is a styrene-butadiene block copolymer containing about 28% by weight styrene and about 72% by weight 1,4-butadiene and it has a molecular weight between 75,000 and 150,000.

The second material of the above defined adhesive composition is a cyclopentadiene-styrene resin which has a cyclopentadiene to styrene weight ratio of from about 1:2 to about 1:4. Its molecular weight can range from about 350 to about 2,500 and have a specific gravity within the range 1 to 1.3. This material also is commercially available. For example, a product known as Neville LX685-180 is available from Neville Chemical Company. This material is characterized by a softening point of 302° F. (ASTM E28 58T), a molecular weight of about 890, a specific gravity of 1.095, and the resin contains 89.9% carbon, 9.1% hydrogen, the remainder being oxygen and sulphur.

The third material of the above-identified adhesive composition is a random terpolymer of from about 30 to about 40 parts by weight of 1,3-pentadiene, about 30 to about 40 parts by weight of a monocyclic terpene, and from about 25 to about 35 parts by weight of alpha methylstyrene. Although a preferred monocyclic terpene for employment in the subject random terpolymer is beta-phellandrene, other monocyclic terpenes or mixtures thereof, may be employed. These include dipentene, alpha-terinene, beta-terpinene, alpha-phellandrene, gamma-terpinene, terpinolene, sylvestrene, origanene, pyronenes, and the like.

It is preferred that the terpolymer additive exhibit the following properties: melting point range (ring and ball), 75°-125° C.; specific gravity 1.08-0.90; bromine No. 614; iodine No. 79; acid value, less then 1; suponification No., less then 1; decomposition temperature (in air) 300° C.; color (in 50% toluene solution) Gardner 6; and viscosity (in toluene) 70%.

A particularly preferred random terpolymer is prepared by polymerizing a feed stream containing 37.5% by weight 1,3-pentadiene, 37.5% beta-phellandrene and 25% by weight of alpha methylstyrene in a toluene diluent in the presence of an aluminum chloride catalyst. The resulting terpolymer contains 34.0 parts by weight of 1,3-pentadiene, 36.5 parts by weight of beta-phellandrene and 29.5 parts by weight of alpha methylstyrene. This material has a molecular weight (weight average) of 1880, a bromine number of 14, an iodine number of 79, a glass transition temperature of 38° C., a viscosity in toluene, f to g of 70° and a decomposition temperature (in air) of 300° C.

In formulating the adhesive composition of the present invention, a preferred parts by weight ratio of the components are as follows: from about 7-10 parts by weight of the styrene-butadiene block copolymer, from about 0.5-1.5 parts by weight of the cyclopentadiene-styrene resin and from about 2-4 parts by weight of the random terpolymer.

The method of blending the three materials together is not critical and does not constitute a part of this invention. Preferably, the three components are physically admixed by means of any mechanical mixing device conventionally used for mixing viscous adhesives or plastics, such as an extruder, Banbury mixer or a differential roll mill. In order to facilitate thorough mixing of the polymers and to develop the desired improved combination of physical properties, the mechanical blending is carried out at sufficiently high temperatures to soften the polymers so that they are thoroughly dispersed and intermingled with each other. Alternatively, the components may be solution blended by dissolving the polymers in a solvent, such as, toluene. The adhesive can be applied from this solution to any surface intended to be adhesion bonded to another surface. It is to be understood that the adhesive mixture of the invention may contain certain other additives to plasticize, lubricate, dye, pigment, prevent oxidation of, retard flammability of, etc. the resin adhesive blend.

Among the benefits obtained by the adhesive formulation of the present invention is its outstanding resistance to the weakening of or destruction of its adhesive bond on exposure to boiling water. The adhesive of the present invention finds exceptional utility in the laminate bonding of organic films one to the other. These films can be identical individual films laminated together or they may be different polymeric films laminated in order to take advantage of the characteristics peculiar to each film. Preferred organic polymer films include polyacrylonitrile films and polyolefin films. As indicated above, however, the present invention is not limited to laminating these two classes of films.

Contemplated PAN films include the homopolymer polyacrylonitrile. This film should possess an oxygen permeability rate of less than about 10 cc/100 in$^2$/24 hr/atm. at 100° F., more preferably less than about 0.1 cc/100 in$^2$/24 hr/atm. at 23° C. and a water vapor transmission rate preferably less than about 50 g/100 in$^2$/24 hr. at 100° F. and 90% relative humidity, more preferably less than about 10 g/100 in$^2$/24 hr. at 100° F.

The aforesaid oxygen and water vapor transmission rates can be determined by various methods known in the art. For example, oxygen transmission rates can conveniently be measured with a Dohrmann polymeric permeation analyzer, PPA-1 (Dohrmann Envirotech Corporation, Mountain View, CA). The Dow cell can also be employed for this purpose, in accordance with ASTM D-1434. It is preferred to use an acrylonitrile homopolymer biaxially oriented film prepared by the polymerization and film formation methods described in U.S. Pat. No. 4,066,731 which is incorporated in its entirety herein by reference.

The polyolefins which are useful herein include the film-forming homopolymers and copolymers formed by the polymerization of one or more $C_2$-$C_8$ alpha-olefins, for example, ethylene, propylene, butene-1, pentene-1, hexene-1, heptene-1, octene-1, etc. The useful polyolefins also include film-forming copolymers of one or more of the aforesaid alpha-olefins copolymerized with up to about 20 weight % total, and preferably not more than about 5 weight % total, of one or more monomers copolymerizable with alpha-olefin. Examples of these include carbon monoxide; sulphur dioxide; acrylic acid or an acrylate ester such as methyl acrylate, amyl acrylate, hexyl acrylate, cyclohexyl acrylate, and the like. In addition, the alpha-olefin can be copolymerized with methacrylic acid or a methacrylate ester, such as, methyl methacrylate, ethyl methacrylate, propyl methacrylate, butyl methacrylate, amyl methacrylate, and the like. They also may be copolymerized with vinyl acetic acid or a vinyl ester such as vinyl formate, vinyl acetate, vinyl propionate, vinyl butyrate, vinyl benzoate, isopropenyl acetate and the like.

It is to be understood that the polyolefin films contemplated herein include mixtures and blends of the polyolefin with one or more other polymers compatible therewith. Thus, for example, the polyolefin film can be prepared from a blend of from about 80 weight % polypropylene with from about 20 weight % polyethylene. The polymers herein can also contain other ingredients such as processing aids, plasticizers, antioxidants, reinforcers, fillers, pigments, etc., in the customary amounts.

While the adhesive composition of the present invention can be applied to the desired surface in a variety of ways a particularly convenient manner is to apply the composition from a dispersion or solution of the same in an appropriate organic solvent, such as, toluene. After application of the solution or dispersion the solvent is removed by drying and a pressure sensitive adhesive film results. The surface to be contacted with the adhesive can be pressed into intimate contact with the adhesive coated layer. Obviously both surfaces may be coated with a thin layer of the adhesive.

The individual films comprising the laminate of interest herein can be prepared in widely varying thicknesses, for example, from about 0.1 mils to about 10 mils and preferably from about 0.5 mils to about 5 mils. The films can be assembled into the laminate employing any one or more of several conventional procedures such as those described in U.S. Pat. No. 3,453,173 which is incorporated herein by reference.

The laminates of this invention can be fabricated into retortable pouches or tubes employing known methods. In accordance with one such procedure, two superimposed layers of the laminate, with the heat-sealable olefin sides facing each other, can be edge-sealed between heated plates. The pouch or tube can thereafter be filled with a food product and the ends or end heat-sealed to complete the package.

EXAMPLE 1

An adhesive within the scope of the present invention was prepared as follows: 30.8 grams of a styrene-butadiene block copolymer containing 28% by weight styrene and 72% by weight of 1,4-butadiene (sold as Kraton 1101, Shell Chemical Company, Polymers Division), 3.6 grams of a cyclopentadiene-styrene resin having a weight ratio of about 33% cyclopentadiene and about 66% styrene (available as Neville LX685-180 from Neville Chemical Company) and 10.6 grams of a random terpolymer of 34 parts by weight of 1,3-pentadiene, 36.5 parts by weight of beta-phellandrene and 29.5 parts by weight of alpha methylstyrene (available as Super Sta-Tac 100 Reichold Chemical Company) were dissolved in 255 ml. of toluene.

EXAMPLE 2

A 7×12-inch piece of biaxially oriented polyacrylonitrile homopolymer film, prepared according to the process disclosed in U.S. Pat. No. 4,066,731, was coated with the adhesive solution in Example 1 using a #8 Meyer rod and the solvent removed by drying for five minutes at 110° C. The coated polyacrylonitrile film was laminated with a three mil film of polypropylene in a flat press at 270° F.

One half of the sample was subjected to boiling water for thirty minutes. Both the boiled and the unboiled samples were tested for peel strength. Both samples had 1.5 pounds/in. peel strength indicating that the adhesion was unaffected by the boiling water treatment.

The adhesive of the invention is highly resistant to boiling water and can be utilized as a pressure-sensitive bonding agent for a wide variety of polymers in addition to those shown above.

What is claimed is:

1. An adhesive composition comprising a homogenous combination of:
   (a) a styrene-butadiene block copolymer having a monomer parts by weight ratio of from about 1 to 3:3 to 1;
   (b) a cyclopentadiene-styrene resin having a monomer parts by weight ratio of from about 1:2 to 1:4 respectively; and
   (c) a random terpolymer of (1) 1,3-pentadiene, (2) a monocyclic terpene; and (3) alpha methylstyrene, wherein the monomers are in a parts by weight ratio of from about 3-4:3-4:2.5-3.5 respectively; said combination comprising a parts by weight ratio of from about 7-10 of (a), 0.5-1.5 of (b), and 2-4 of (c).

2. The adhesive of claim 1 wherein said monocyclic terpene is beta-phellandrene.

3. The adhesive of claim 1 dissolved or dispersed in an organic medium.

4. The adhesive of claim 1 wherein (a) has a styrene-butadiene weight ratio of about 1:2.5 respectively; (b) has a cyclopentadiene-styrene weight ratio of about 1:2 respectively; (c) has a (1):(2):(3) weight ratio of about 3.5:3.5:3 respectively.

5. The adhesive of claim 4 wherein the combination comprises about 8 parts by weight of (a), 1 part by weight of (b) and 3 parts by weight of (c).

* * * * *